US012304522B2

(12) United States Patent
Aso

(10) Patent No.: US 12,304,522 B2
(45) Date of Patent: May 20, 2025

(54) VEHICLE DRIVING SUPPORT DEVICE SETTING TARGET TRAVELING LINE

(71) Applicant: TOYOTA JIDOSHA KABUSHIKI KAISHA, Toyota (JP)

(72) Inventor: Kazuaki Aso, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 17/963,468

(22) Filed: Oct. 11, 2022

(65) Prior Publication Data

US 2023/0125510 A1 Apr. 27, 2023

(30) Foreign Application Priority Data

Oct. 25, 2021 (JP) .................................. 2021-173570

(51) Int. Cl.
G01C 22/00 (2006.01)
B60W 30/12 (2020.01)
B60W 60/00 (2020.01)

(52) U.S. Cl.
CPC .......... *B60W 60/001* (2020.02); *B60W 30/12* (2013.01); *B60W 2552/53* (2020.02)

(58) Field of Classification Search
CPC . B60W 60/001; B60W 30/12; B60W 2552/53
See application file for complete search history.

(56) References Cited

U.S. PATENT DOCUMENTS

| 2018/0141588 | A1 | 5/2018 | Shimizu |
| 2020/0086866 | A1 | 3/2020 | Miura et al. |
| 2020/0172100 | A1* | 6/2020 | Kato ........................ G08G 1/16 |
| 2021/0071285 | A1 | 3/2021 | Lorenzino |
| 2021/0188258 | A1 | 6/2021 | Goto et al. |
| 2021/0188262 | A1 | 6/2021 | Goto et al. |
| 2021/0387645 | A1* | 12/2021 | Kim ............... B60W 30/18154 |
| 2022/0306164 | A1* | 9/2022 | Jeon ..................... B60W 50/14 |

FOREIGN PATENT DOCUMENTS

| JP | 2007-261449 A | 10/2007 |
| JP | 2015-189404 A | 11/2015 |
| JP | 2019-077290 A | 5/2019 |
| JP | 2019-077291 A | 5/2019 |
| WO | 2017/022474 A1 | 2/2017 |
| WO | 2019/003295 A1 | 1/2019 |
| WO | 2019/122639 A1 | 6/2019 |

* cited by examiner

Primary Examiner — Adam M Alharbi
(74) Attorney, Agent, or Firm — Sughrue Mion, PLLC

(57) ABSTRACT

A vehicle driving support device: sets a left limit line extending along a current lane and passing through a position distanced in a right direction from a left-side target by a predetermined distance as a left end line, and sets a right limit line extending along the current lane and passing through a position distanced in a left direction from a right-side target by a predetermined distance as a right end line; and sets a lane center line as a target traveling line when the lane center line is located between the right and left end lines, and sets a line closer to the lane center line as the target traveling line when the lane center line is not located between the right and left end lines, in a case where the left end line and the right end line are set in a left-to-right order.

8 Claims, 14 Drawing Sheets

VEHICLE DRIVING SUPPORT DEVICE SETTING TARGET TRAVELING LINE

CROSS-REFERENCE TO RELATED APPLICATION

This application claims priority to Japanese Patent Application No. 2021-173570 filed on Oct. 25, 2021, incorporated herein by reference in its entirety.

BACKGROUND

1. Technical Field

The present disclosure relates to a vehicle driving support device.

2. Description of Related Art

There is known a vehicle driving support device that sets a target traveling line and executes lane keeping control for performing autonomous steering in which an own vehicle is autonomously steered so that the own vehicle travels along the target traveling line. As such a vehicle driving support device, there is known a vehicle driving support device configured to offset the target traveling line to the left side or the right side, when the driver of the own vehicle wishes to drive the own vehicle on the left side or the right side of a center line of a current lane (lane center line), in the case where the target traveling line is set to the lane center line and the lane keeping control is executed (for example, see WO 2017-022474).

Further, as a vehicle driving support device, there is known a vehicle driving support device that is configured to limit the amount of offset of the target traveling line so that the target traveling line is not offset to an extent exceeding a line distanced to the current lane side from the left side lane marking line or the right side lane marking line by a predetermined distance (left limit line and right limit line), when the target traveling line is offset to the left side or the right side as described above, in order to ensure the traveling safety of the own vehicle (for example, see WO 2017-022474). That is, as a vehicle driving support device, there is known a vehicle driving support device configured to set a target traveling line in consideration of safety on the left side or the right side of the current lane.

SUMMARY

When there is another vehicle traveling side by side with the own vehicle in an adjacent lane on the right side or the left side of the current lane, the driver often wishes to cause the own vehicle to travel at a certain distance from the other vehicle. Therefore, to set the target traveling line in consideration of the safety on the right side or the left side of the current lane during execution of the lane keeping control, it is desirable to set the target traveling line so that not only a certain distance is secured from the right and left lane marking lines of the current lane, but also a certain distance is secured from targets other than the right and left lane marking lines of the current lane, such as other vehicles that travel side by side with the own vehicle in the adjacent lane on the right side or the left side of the current lane.

In order to achieve this, for example, it can be considered to acquire a line distanced from each of the targets including the right and left lane marking lines of the current lane and other vehicles in the adjacent lane by an appropriate distance, and set the range defined by those lines (target settable range) as the target traveling line.

However, when the target traveling line is set in this way, the distance from the targets including other vehicles in the adjacent lane is taken into consideration when setting the target traveling line, so that the target settable range may be acquired being deviated on either the right side or the left side of the current lane. At this time, if the target traveling line is set within the target settable range, the target traveling line may be set to a position excessively on the left side or a position excessively on the right side in the current lane, which may hinder setting an appropriate target traveling line from the viewpoint of the traveling safety of the own vehicle. That is, if there are a plurality of targets on the right and left sides of the current lane which the own vehicle should keep a distance from, an appropriate target traveling line may not be set.

An object of the present disclosure is to provide a vehicle driving support device capable of setting an appropriate target traveling line even when there are targets on the right and left sides of the current lane which the own vehicle should keep a distance from.

A vehicle driving support device according to the present disclosure includes a control device that sets a target traveling line and executes lane keeping control for performing autonomous steering in which an own vehicle is autonomously steered such that the own vehicle travels along the target traveling line.

The control device is configured to set a left limit line extending along a current lane and passing through a position distanced in a right direction from a left-side target by a predetermined left side separation distance as a left end line, the left-side target being a target existing on a left side of the own vehicle, and set a right limit line extending along the current lane and passing through a position distanced in a left direction from a right-side target by a predetermined right side separation distance as a right end line, the right-side target being a target existing on a right side of the own vehicle, during execution of the lane keeping control.

The control device is also configured to set a center line of the current lane as the target traveling line when the center line is located between the left end line and the right end line, and set a line closer to the center line, of the left end line and the right end line, as the target traveling line when the center line is not located between the left end line and the right end line, in a case where the left end line and the right end line are set in a left-to-right order.

According to this, when the center line of the current lane is within the range (target settable range) defined by the left end line and the right end line, the center line of the current lane is set as the target traveling line, so that an appropriate target traveling line can be set. On the other hand, even when the center line of the current lane does not exist within the target settable range, the line closer to the center line of the current lane, of the left end line and the right end line that define the target settable range, is set as the target traveling line, so that an appropriate target traveling line can be set.

In the vehicle driving support device according to the present disclosure, the control device may be configured to set a line between the left end line and the right end line as the target traveling line when the left end line and the right end line are set in a right-to-left order.

In the case where the left end line and the right end line are set in a right-to-left order and the range defined by the left end line and the right end line is acquired as the target settable range, when a center line of the current lane is set as the target traveling line due to the center line existing within the target settable range, or when a line closer to the center line of the current lane, of the left end line or the right end line, is set as the target traveling line due to the center line not existing within the target settable range, cases may occur where a sufficient distance can be secured from one target, but a sufficient distance cannot be secured from another target.

According to the present disclosure, when the left end line and the right end line are set in a right-to-left order, a line between the left end line and the right end line is set as the target traveling line. Therefore, an appropriate target traveling line can be set.

Further, in the vehicle driving support device according to the present disclosure, the control device may be configured to set a center line between the left end line and the right end line as the target traveling line when the left end line and the right end line are set in the right-to-left order.

According to the present disclosure, when the left end line and the right end line are set in a right-to-left order, a center line between the left end line and the right end line is set as the target traveling line. Therefore, a more appropriate target traveling line can be set.

Further, in the vehicle driving support device according to the present disclosure, the control device may be configured to reset the right limit line as a line that coincides with the left limit line when a target priority of the left limit line is higher than a target priority of the right limit line, and reset the left limit line as a line that coincides with the right limit line when the target priority of the right limit line is higher than the target priority of the left limit line, in a case where the left limit line and the right limit line are set in a right-to-left order.

When the left limit line and the right limit line are set in a right-to-left order, cases may occur where a sufficient distance can be secured from one target but a sufficient distance cannot be secured from another target, regardless of the line adopted as the target to be considered in setting the target traveling line. However, when the target priorities of these targets are different, by adopting the line having the higher target priority as the target to be considered in setting the target traveling line, a more appropriate target traveling line can be set.

According to the present disclosure, the right limit line is reset as a line that coincides with the left limit line when a target priority of the left limit line is higher than a target priority of the right limit line, and the left limit line is reset as a line that coincides with the right limit line when the target priority of the right limit line is higher than the target priority of the left limit line, in a case where the left limit line and the right limit line are set in a right-to-left order. Therefore, the line having the higher target priority is taken into consideration in setting the target traveling line as the left end line or the right end line. Therefore, a more appropriate target traveling line can be set.

Further, in the vehicle driving support device according to the present disclosure, the control device may be configured to reset the left limit line having a lower target priority as a line coinciding with the left limit line having a higher target priority when there are at least two left limit lines having different target priorities and the left limit line having the lower target priority is set on a left side of the left limit line having the higher target priority, and reset the right limit line having a lower target priority as a line coinciding with the right limit line having a higher target priority when there are at least two right limit lines having different target priorities and the right limit line having the lower target priority is set on a right side of the right limit line having the higher target priority.

When there are two left limit lines having different target priorities, the left limit line that should be set as the left end line is determined in accordance with the positional relationship between the left limit lines and the degree of the target priorities, so that a more appropriate target traveling line can be set. Similarly, when there are two right limit lines having different target priorities, the right limit line that should be set as the right end line is determined in accordance with the positional relationship between the right limit lines and the degree of the target priorities, so that a more appropriate target traveling line can be set.

According to the present disclosure, the left limit line having a lower target priority is reset as a line coinciding with the left limit line having a higher target priority when there are at least two left limit lines having different target priorities and the left limit line having the lower target priority is set on a left side of the left limit line having the higher target priority. As a result, the left limit line having the higher target priority is set as the left end line. Further, the right limit line having a lower target priority is reset as a line coinciding with the right limit line having a higher target priority when there are at least two right limit lines having different target priorities and the right limit line having the lower target priority is set on a right side of the right limit line having the higher target priority. As a result, the right limit line having the higher target priority is set as the right end line. Therefore, a more appropriate target traveling line can be set.

Further, in the vehicle driving support device according to the present disclosure, the target priority is a priority as a target to be considered in setting the target traveling line, and the target priority becomes higher as a requirement to be considered in setting the target traveling line becomes higher.

The target priority is related to the determination on whether to consider the left limit line or the right limit line in setting the target traveling line. According to the present disclosure, a priority that serves as a target to be considered in setting the target traveling line and that becomes higher as a requirement to be considered in setting the target traveling line becomes higher is used as the target priority. Therefore, a more appropriate target traveling line can be set.

A vehicle driving support device according to the present disclosure includes a control device that sets a target traveling line and executes lane keeping control for performing autonomous steering in which an own vehicle is autonomously steered such that the own vehicle travels along the target traveling line.

The control device is configured to set a left limit line extending along a current lane and passing through a position distanced in a right direction from a left-side target by a predetermined left side separation distance as a left end line, the left-side target being a target existing on a left side of the own vehicle, and set a right limit line extending along the current lane and passing through a position distanced in a left direction from a right-side target by a predetermined right side separation distance as a right end line, the right-side target being a target existing on a right side of the own vehicle, during execution of the lane keeping control.

The control device is also configured to set the target traveling line in accordance with a positional relationship between the left end line, the right end line, and a center line of the current lane when the left end line and the right end line are set in a left-to-right order.

The control device is also configured to set a line between the left end line and the right end line as the target traveling line when the left end line and the right end line are set in a right-to-left order.

According to the present disclosure, when the left end line and the right end line are set in a right-to-left order, a line between the left end line and the right end line is set as the target traveling line. Therefore, an appropriate target traveling line can be set for the same reason as described above.

The components of the present disclosure are not limited to the embodiment of the present disclosure described later with reference to the drawings. Other objects, other features, and accompanying advantages of the present disclosure will be readily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
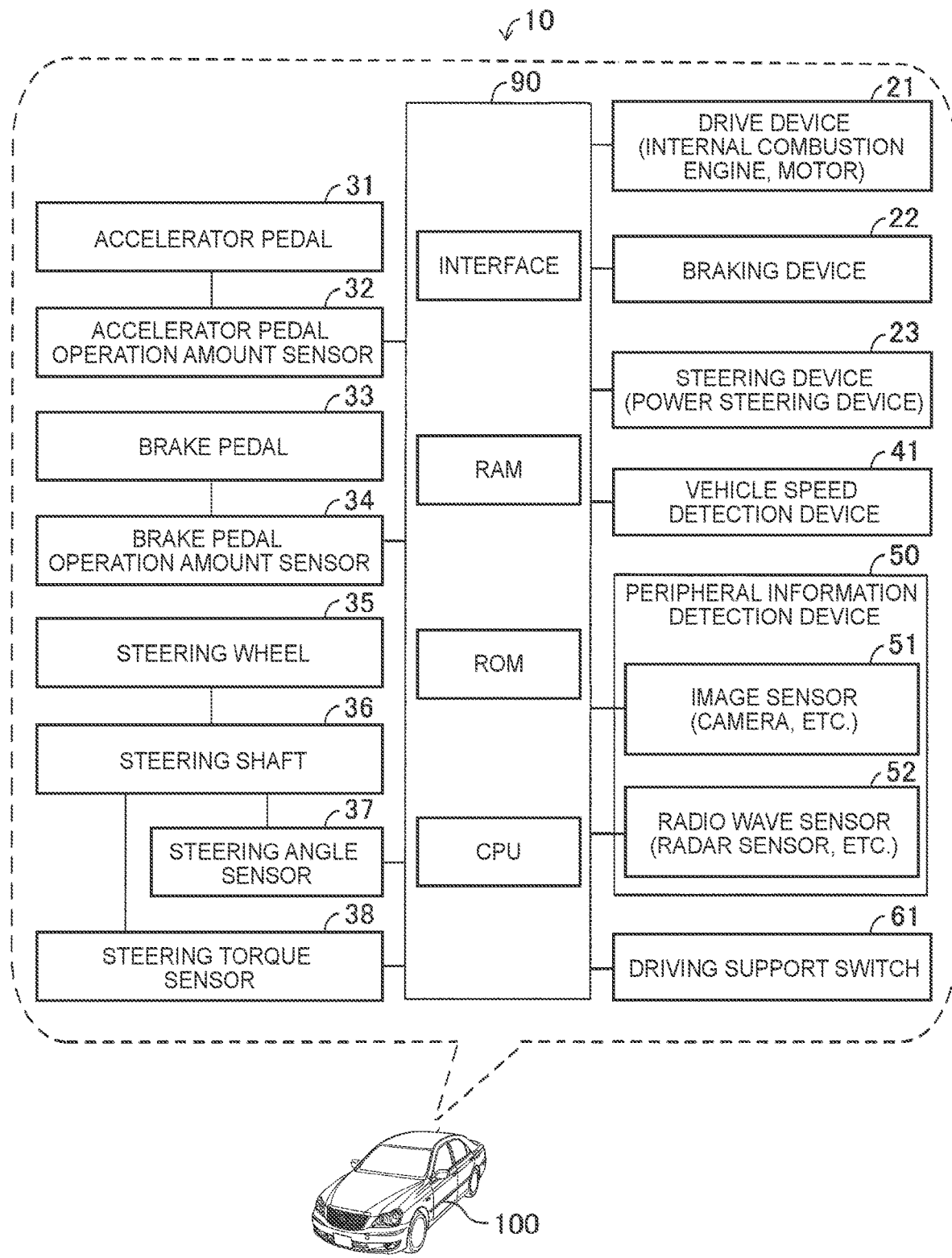
FIG. 1 is a diagram showing a vehicle driving support device according to an embodiment of the present disclosure and a vehicle (an own vehicle) on which the device is mounted.

Hereinafter, a vehicle driving support device according to an embodiment of the present disclosure will be described with reference to the drawings. As shown in FIG. 1, a vehicle driving support device 10 according to the embodiment of the present disclosure is mounted on an own vehicle 100.

ECU

The vehicle driving support device 10 includes an ECU 90 as a control device. The term ECU is an abbreviation for electronic control unit. The ECU 90 includes a microcomputer as a main part. The microcomputer includes a central processing unit (CPU), a read-only memory (ROM), a random access memory (RAM), a non-volatile memory, an interface, and the like. The CPU realizes various functions by executing instructions, programs, or routines stored in the ROM.

Drive Device, Etc.

The own vehicle 100 is equipped with a drive device 21, a braking device 22, and a steering device 23.

Drive Device

The drive device 21 is a device that outputs a driving torque (driving force) applied to the own vehicle 100 in order to cause the own vehicle 100 to travel, and is, for example, an internal combustion engine, a motor, or the like. The drive device 21 is electrically connected to the ECU 90. The ECU 90 can control the driving torque output from the drive device 21 by controlling the operation of the drive device 21.

Braking Device

The braking device 22 is a device that outputs a braking torque (braking force) applied to the own vehicle 100 in order to brake the own vehicle 100. The braking device 22 is electrically connected to the ECU 90. The ECU 90 can control the braking torque output from the braking device 22 by controlling the operation of the braking device 22.

Steering Device

The steering device 23 is a device that outputs a steering torque (steering force) applied to the own vehicle 100 in order to steer the own vehicle 100, and is, for example, a power steering device. The steering device 23 is electrically connected to the ECU 90. The ECU 90 can control the steering torque output from the steering device 23 by controlling the operation of the steering device 23.

Sensors, Etc.

An accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle speed detection device 41, a peripheral information detection device 50, and a driving support switch 61 are also mounted on the own vehicle 100.

Accelerator Pedal Operation Amount Sensor

The accelerator pedal operation amount sensor 32 is a sensor that detects the operation amount of the accelerator pedal 31, and is electrically connected to the ECU 90. The accelerator pedal operation amount sensor 32 transmits information of the detected operation amount of the accelerator pedal 31 to the ECU 90. The ECU 90 acquires the operation amount of the accelerator pedal 31 (accelerator pedal operation amount) based on the information. The ECU 90 acquires a required driving torque (required driving force) by calculation based on the accelerator pedal operation amount and the vehicle speed (own vehicle speed) of the own vehicle 100. The required driving torque is the driving torque required to be output from the drive device 21. The ECU 90 controls the operation of the drive device 21 so that the required driving torque is output.

Brake Pedal Operation Amount Sensor

The brake pedal operation amount sensor 34 is a sensor that detects the operation amount of the brake pedal 33, and is electrically connected to the ECU 90. The brake pedal operation amount sensor 34 transmits information of the detected operation amount of the brake pedal 33 to the ECU 90. The ECU 90 acquires the operation amount of the brake pedal 33 (brake pedal operation amount) based on the information. The ECU 90 acquires the required braking torque (required braking force) by calculation based on the brake pedal operation amount. The required braking torque is the braking torque required to be output from the braking device 22. The ECU 90 controls the operation of the braking device 22 so that the required braking torque is output.

Steering Angle Sensor

The steering angle sensor 37 is a sensor that detects the rotation angle of the steering shaft 36 with respect to the neutral position, and is electrically connected to the ECU 90. The steering angle sensor 37 transmits information of the detected rotation angle of the steering shaft 36 to the ECU 90. The ECU 90 acquires the rotation angle of the steering shaft 36 (steering angle θ) based on the information.

Steering Torque Sensor

The steering torque sensor 38 is a sensor that detects the torque input to the steering shaft 36 by the driver via the steering wheel 35, and is electrically connected to the ECU 90. The steering torque sensor 38 transmits the detected torque information to the ECU 90. The ECU 90 acquires the torque (driver steering torque TQ_D or steering operation force) input to the steering shaft 36 by the driver via the steering wheel 35 based on the information.

Vehicle Speed Detection Device

The vehicle speed detection device 41 is a device that detects the vehicle speed (own vehicle speed) of the own vehicle 100, and is, for example, a wheel speed sensor. The vehicle speed detection device 41 is electrically connected to the ECU 90. The vehicle speed detection device 41 transmits information of the detected vehicle speed of the own vehicle 100 to the ECU 90. The ECU 90 acquires the vehicle speed (own vehicle speed V) of the own vehicle 100 based on the information.

The ECU 90 acquires the driver-required steering torque by calculation based on the steering angle θ, the driver steering torque TQ_D, and the own vehicle speed V. The driver-required steering torque is the steering torque required to be output from the steering device 23. The ECU 90 controls the operation of the steering device 23 so that the driver-required steering torque is output from the steering device 23 when the lane keeping control described later is not being executed.

Peripheral Information Detection Device

The peripheral information detection device 50 is a device that detects information of the periphery of the own vehicle 100, and in this example, includes an image sensor 51 and a radio wave sensor 52. The image sensor 51 is, for example, a camera. The radio wave sensor 52 is, for example, a radar sensor (millimeter wave radar or the like). The peripheral information detection device 50 may include a sound wave sensor such as an ultrasonic sensor (clearance sonar) or an optical sensor such as a laser radar (LiDAR) sensor.

Image Sensor

The image sensor 51 is electrically connected to the ECU 90. The image sensor 51 captures an image of the periphery of the own vehicle 100 and transmits information related to the captured image to the ECU 90. The ECU 90 can acquire information (peripheral detection information IS) about the periphery of the own vehicle 100 based on the information (image information).

Radio Wave Sensor

The radio wave sensor 52 is electrically connected to the ECU 90. The radio wave sensor 52 transmits radio waves and receives radio waves (reflected waves) reflected by an object. The radio wave sensor 52 transmits information (detection result) related to the transmitted radio waves and the received radio waves (reflected waves) to the ECU 90. In other words, the radio wave sensor 52 detects an object existing in the periphery of the own vehicle 100, and transmits information (detection result) related to the detected object to the ECU 90. The ECU 90 can acquire information (peripheral detection information IS) related to the object existing in the periphery of the own vehicle 100 based on the information (radio wave information).

Driving Support Switch

The driving support switch 61 is a switch for allowing the driver to select whether to execute the lane keeping control described later, and is electrically connected to the ECU 90. When the driving support switch 61 is operated in the ON state, the ECU 90 determines that the execution of the lane keeping control is requested. On the other hand, when the driving support switch 61 is operated in the OFF state, the ECU 90 determines that the execution of the lane keeping control is no longer required.

Outline of Operation of Vehicle Driving Support Device

Next, the outline of the operation of the vehicle driving support device 10 will be described. In the following description, "left" represents the left side with respect to the traveling direction of the own vehicle 100, and "right" represents the right side with respect to the traveling direction of the own vehicle 100.

Figure 2A:
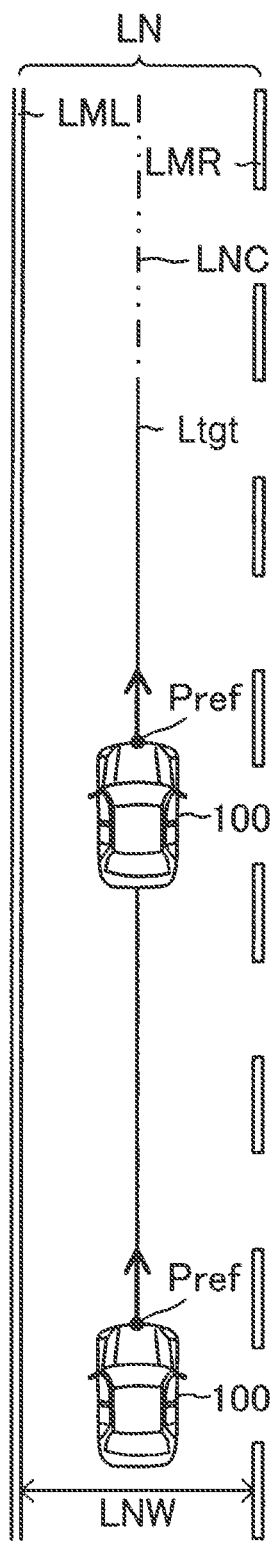
FIG. 2A is a diagram showing a scene in which steering torque is controlled so that the own vehicle travels on a target traveling line by lane keeping control.

The vehicle driving support device 10 is configured to execute the lane keeping control in which the own vehicle 100 is autonomously steered so that the reference point (own vehicle reference point Pref) of the own vehicle 100 moves on the target traveling line Ltgt, as shown in FIG. 2A, when the execution of the lane keeping control is requested. The own vehicle reference point Pref only needs to be a point indicating the position of the own vehicle 100, and in this example, is a position on the front end portion of the own vehicle 100 and is a position at the center of the own vehicle 100 in the width direction. The setting of the target traveling line Ltgt will be described later.

Figure 2B:
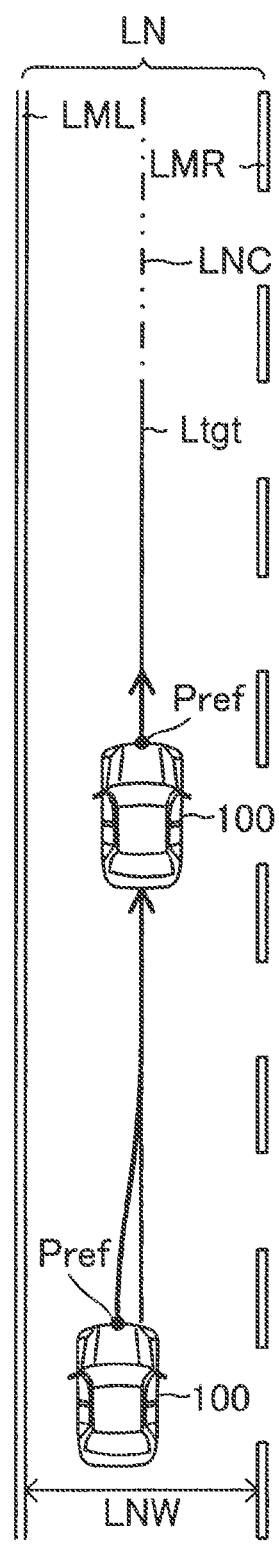
FIG. 2B is a diagram showing a scene in which the steering torque is controlled so that the own vehicle deviating to the left side from the target traveling line is steered to the right side by the lane keeping control and travels on the target driving line.

As shown in FIG. 2B, when the own vehicle reference point Pref deviates to the left side from the target traveling line Ltgt during the execution of the lane keeping control, the vehicle driving support device 10 autonomously steers the own vehicle 100 so that the own vehicle 100 moves to the right side and the own vehicle reference point Pref moves on the target traveling line Ltgt.

More specifically, the vehicle driving support device 10 acquires the distance (deviation amount D) between the own vehicle reference point Pref and the target traveling line Ltgt based on the peripheral detection information IS, and when the deviation amount D is larger than zero and the own vehicle reference point Pref is located on the left side of the target traveling line Ltgt, the vehicle driving support device 10 calculates the steering torque for moving the own vehicle 100 to the right side in accordance with the deviation amount D, and causes the steering device 23 to output a steering torque corresponding to the calculated steering torque (system steering torque TQ_S).

Figure 2C:
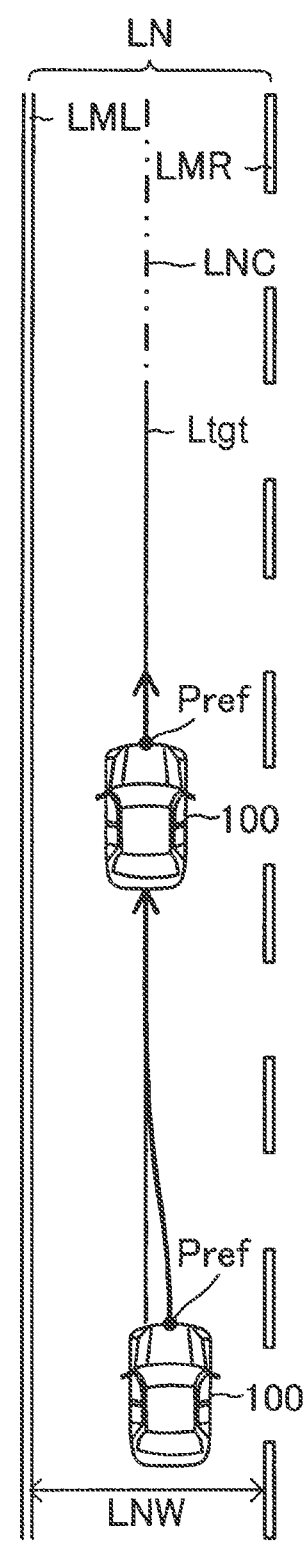
FIG. 2C is a diagram showing a scene in which the steering torque is controlled so that the own vehicle deviating to the right side from the target traveling line is steered to the left side by the lane keeping control and travels on the target traveling line.

On the other hand, as shown in FIG. 2C, when the own vehicle reference point Pref deviates to the right side from the target traveling line Ltgt during the execution of the lane keeping control, the vehicle driving support device 10 autonomously steers the own vehicle 100 so that the own vehicle 100 moves to the left side and the own vehicle reference point Pref moves on the target traveling line Ltgt.

More specifically, the vehicle driving support device 10 acquires the deviation amount D based on the peripheral detection information IS, and when the deviation amount D is larger than zero and the own vehicle reference point Pref is located on the right side of the target traveling line Ltgt, the vehicle driving support device 10 calculates the steering torque for moving the own vehicle 100 to the left side in accordance with the deviation amount D, and causes the steering device 23 to output a steering torque corresponding to the calculated steering torque (system steering torque TQ_S).

Accordingly, the own vehicle 100 travels so that the own vehicle reference point Pref moves along the target traveling line Ltgt during the execution of the lane keeping control.

Setting of Target Traveling Line

Next, the setting of the target traveling line Ltgt by the vehicle driving support device 10 will be described.

Figure 3:
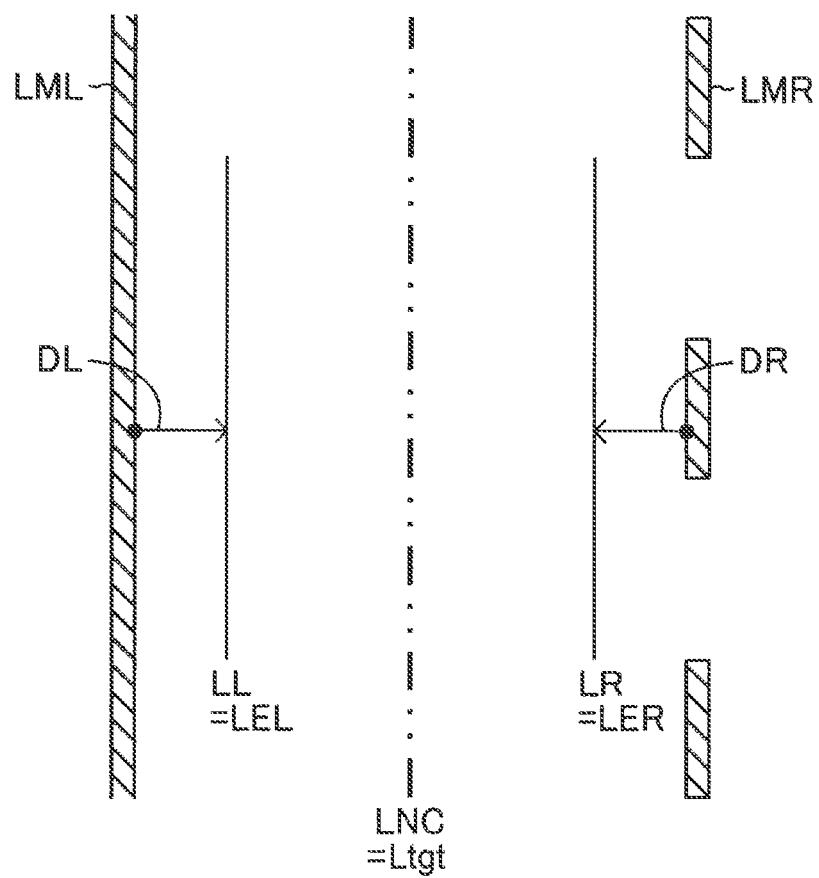
FIG. 3 is a diagram showing a left limit line and a right limit line.

As shown in FIG. 3, when there is no target including an object other than the left side lane marking line LML and the right side lane marking line LMR on the left side and the right side of the current lane LN, the vehicle driving support device 10 acquires a line extending along the current lane LN and passing through a position distanced to the right from the left side lane marking line LML by a predetermined distance (predetermined left side separation distance DL) as a left limit line LL, and acquires a line extending along the current lane LN and passing through a position distanced to the left from the right side lane marking line LMR by a predetermined distance (predetermined right side separation distance DR) as a right limit line LR.

In this example, the object is another vehicle traveling in the adjacent lane on the left side or the right side of the current lane LN, a wall installed on the left side or the right side of the current lane LN, a triangular cone placed on the road, or the like, and the vehicle driving support device 10 detects such an object based on the peripheral detection information IS (particularly, radio wave information) to acquire the position of the object based on the peripheral detection information IS (particularly, radio wave information).

Further, in this example, the target includes the left side lane marking line LML, the right side lane marking line LMR, and the curb provided on the side of the road. The vehicle driving support device 10 detects the left side lane marking line LML, the right side lane marking line LMR, and the curb based on the peripheral detection information IS (particularly, image information), and can acquire the positions of the left side lane marking line LML, the right side lane marking line LMR, and the curb based on the peripheral detection information IS (particularly, image information).

The vehicle driving support device 10 sets the acquired left limit line LL and the acquired right limit line LR as the left end line LEL and the right end line LER, respectively, and sets the line extending through the center position between the left end line LEL and the right end line LER (that is, the lane center line LNC) as the target traveling line Ltgt.

In other words, the vehicle driving support device 10 sets the acquired left limit line LL and the acquired right limit line LR as the left end line LEL and the right end line LER, respectively, and when the own vehicle 100 is located between the left end line LEL and the right end line LER, the vehicle driving support device 10 sets the center line (that is, the lane center line LNC) of the range (target settable range) defined by the left end line LEL and the right end line LER as the target traveling line Ltgt.

In this example, the lane center line LNC is a line extending along the center of the width of the current lane LN along the current lane LN. The current lane LN is the lane (traveling lane) in which the own vehicle 100 is traveling. The vehicle driving support device 10 acquires the left side lane marking line LML and the right side lane marking line LMR based on the peripheral detection information IS, acquires the distance (lane width LNW) between the left side lane marking line LML and the right side lane marking line LMR, acquires the lane width LNW as the travelable width of the own vehicle 100 (the width in which the own vehicle 100 can travel), and acquires the line passing through the center of the travelable width (center line) as the lane center line LNC.

However, when there are targets including objects on the left side of the current lane LN in addition to the left side lane marking line LML, the vehicle driving support device 10 sets a left limit line LL for each of the targets, and sets the left limit line LL located on the rightmost side of the left limit lines LL as the left end line LEL. For example, as shown in FIG. 4, when the vehicle driving support device 10 sets three left limit lines LL (first left limit line LL1, second left limit line LL2, and third left limit line LL3), of those left limit lines LL, the third left limit line LL3 located on the rightmost side is set as the left end line LEL.

Figure 4:
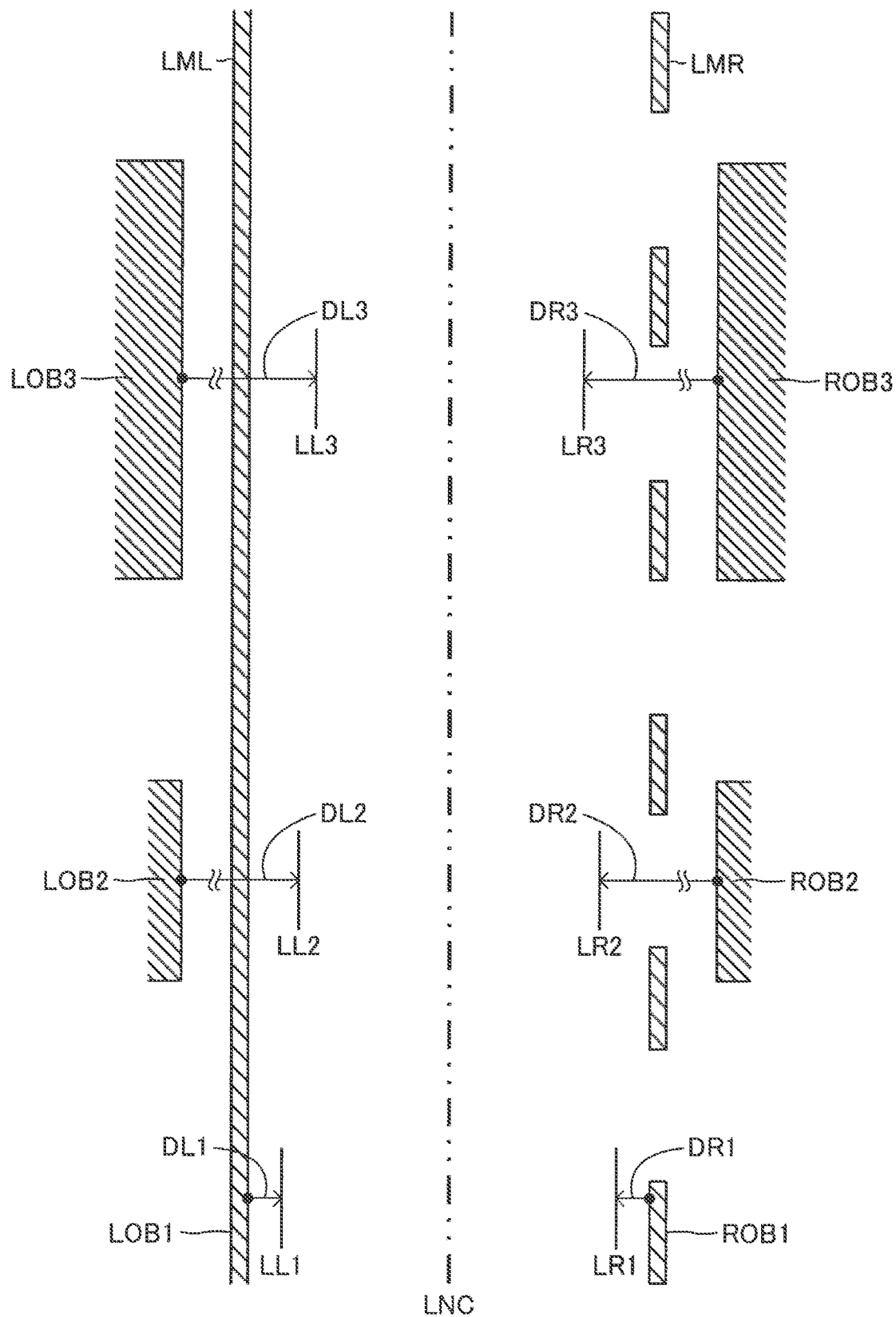
FIG. 4 is a diagram showing a left limit line and a right limit line set in accordance with a type of a target.

The first left limit line LL1 shown in FIG. 4 is a line extending along the current lane LN and passing through a position distanced from the first left side target LOB1 (the left side lane marking line LML in FIG. 4) by a predetermined distance (first left side separation distance DL1) in the right direction. The second left limit line LL2 is a line extending along the current lane LN and passing through a position distanced from the second left side target LOB2 (for example, a relatively small vehicle such as a passenger vehicle traveling in the adjacent lane on the left side of the current lane LN) by a predetermined distance (second left side separation distance DL2) in the right direction. The third left limit line LL3 is a line extending along the current lane LN and passing through a position distanced from the third left side target LOB3 (for example, a relatively large vehicle such as a truck or a bus traveling in the adjacent lane on the left side of the current lane LN) by a predetermined distance (third left side separation distance DL3) in the right direction.

In this example, the predetermined left side separation distance DL is preset for each type of the target, and a longer distance is set as the driver wishes to cause the own vehicle 100 to travel at a longer distance from the target.

Therefore, as shown in FIG. 4, the predetermined left side separation distance DL (second left side separation distance DL2) set for a relatively small vehicle such as a passenger vehicle traveling in the adjacent lane on the left side of the current lane LN is set to be longer than the predetermined left side separation distance DL (first left side separation distance DL1) set for the left side lane marking line LML. Further, the predetermined left side separation distance DL (third left side separation distance DL3) set for a relatively large vehicle such as a truck or a bus traveling in the adjacent lane on the left side of the current lane LN is set to be longer than the predetermined left side separation distance DL (second left side separation distance DL2) set for a relatively small vehicle such as a passenger vehicle traveling in the adjacent lane on the left side of the current lane LN.

Similarly, when there are targets on the right side of the current lane LN in addition to the right side lane marking line LMR, the vehicle driving support device 10 sets a right limit line LR for each of the targets, and sets the right limit line LR located on the leftmost side of the right limit lines LR as the right end line LER. For example, as shown in FIG. 4, when the vehicle driving support device 10 sets three right limit lines LR (first right limit line LR1, second right limit line LR2, and third right limit line LR3), of those right limit lines LR, the third right limit line LR3 located on the leftmost side is set as the right end line LER.

The first right limit line LR1 shown in FIG. 4 is a line extending along the current lane LN and passing through a position distanced from the first right side target ROB1 (the right side lane marking line LMR in FIG. 4) by a predetermined distance (first right side separation distance DR1) in the left direction. The second right limit line LR2 is a line extending along the current lane LN and passing through a position distanced from the second right side target ROB2 (for example, a relatively small vehicle such as a passenger vehicle traveling in the adjacent lane on the right side of the current lane LN) by a predetermined distance (second right side separation distance DR2) in the left direction. The third right limit line LR3 is a line extending along the current lane LN and passing through a position distanced from the third right side target ROB3 (for example, a relatively large vehicle such as a truck or a bus traveling in the adjacent lane on the right side of the current lane LN) by a predetermined distance (third right side separation distance DR3) in the left direction.

In this example, the predetermined right side separation distance DR is preset for each type of the target, and a longer distance is set as the driver wishes to cause the own vehicle 100 to travel at a longer distance from the target.

Therefore, as shown in FIG. 4, the predetermined right side separation distance DR (second right side separation distance DR2) set for a relatively small vehicle such as a passenger vehicle traveling in the adjacent lane on the right side of the current lane LN is set to be longer than the predetermined right side separation distance DR (first right side separation distance DR1) set for the right side lane marking line LMR. Further, the predetermined right side separation distance DR (third right side separation distance DR3) set for a relatively large vehicle such as a truck or a bus traveling in the adjacent lane on the right side of the current lane LN is set to be longer than the predetermined right side separation distance DR (second right side separation distance DR2) set for a relatively small vehicle such as a passenger vehicle traveling in the adjacent lane on the right side of the current lane LN.

Figure 5:
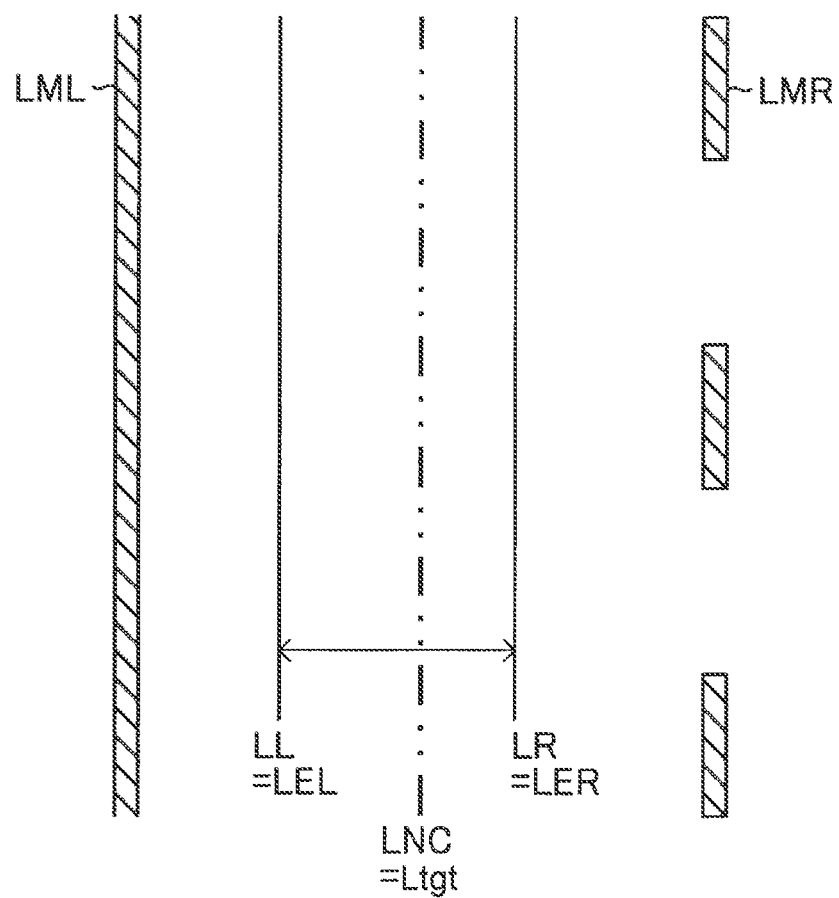
FIG. 5 is a diagram showing a scene in which a lane center line exists between a left end line and a right end line.

As shown in FIG. 5, in the case where the left end line LEL and the right end line LER are set in the left-to-right order (that is, the left end line LEL is set on the left side of the right end line LER, and therefore the right end line LER is set on the right side of the left end line LEL), when the lane center line LNC exists between the left end line LEL and the right end line LER, the vehicle driving support device 10 sets the lane center line LNC as the target traveling line Ltgt.

Figure 6A:
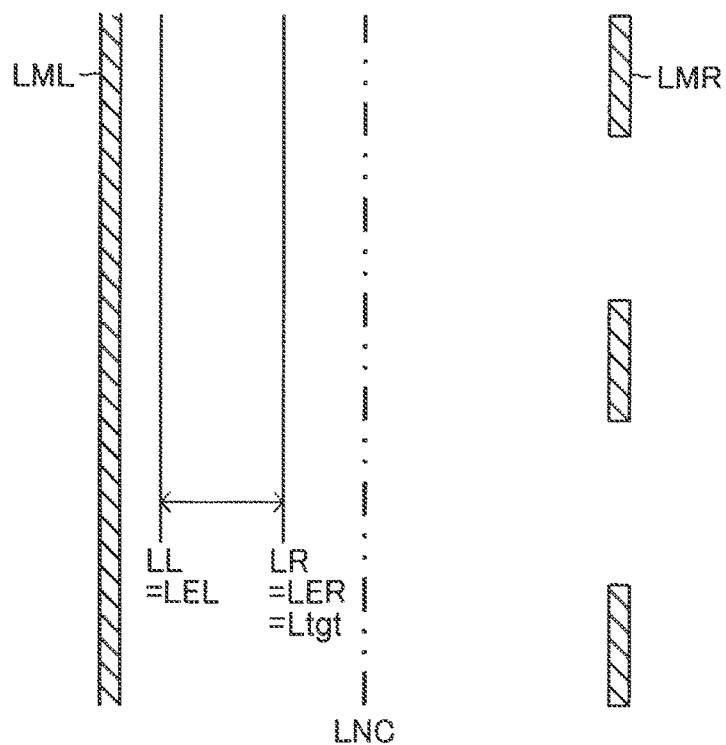
FIG. 6A is a diagram showing a scene in which the left end line and the right end line are set on the left side of the lane center line and the lane center line does not exist between the left end line and the right end line.

Further, as shown in FIG. 6A, when the left end line LEL and the right end line LER are set in the left-to-right order and both the left end line LEL and the right end line LER are set on the left side of the lane center line LNC so that the lane center line LNC does not exist between the left end line LEL and the right end line LER, the vehicle driving support device 10 sets the line closest to the lane center line LNC, of the left end line LEL and the right end line LER, as the target traveling line Ltgt. In the scene shown in FIG. 6A, since the left end line LEL and the right end line LER are set on the left side of the lane center line LNC, the vehicle driving support device 10 sets the right end line LER closer to the lane center line LNC as the target traveling line Ltgt.

Figure 6B:
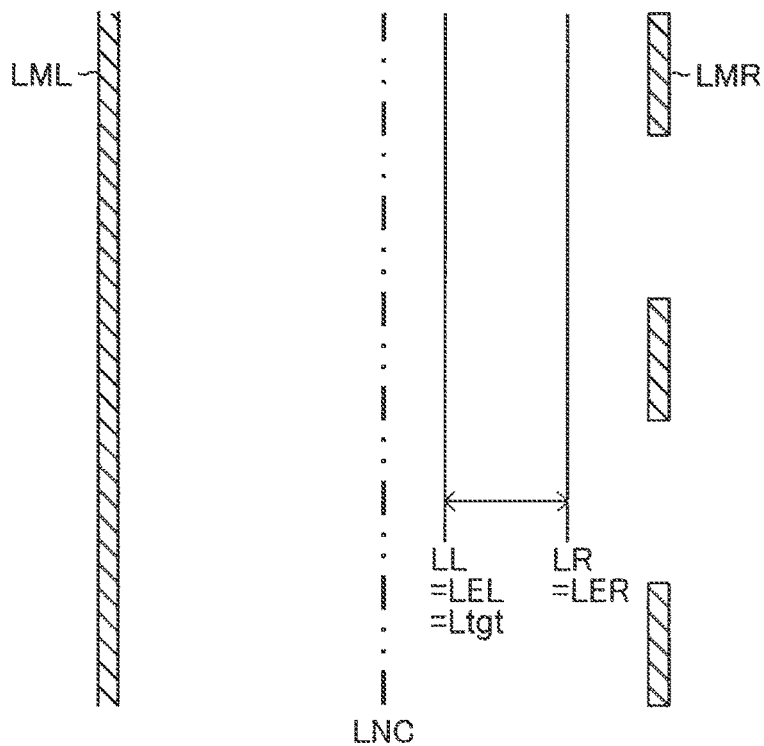
FIG. 6B is a diagram showing a scene in which the left end line and the right end line are set on the right side of the lane center line and the lane center line does not exist between the left end line and the right end line.

Similarly, as shown in FIG. 6B, when the left end line LEL and the right end line LER are set in the left-to-right order and both the left end line LEL and the right end line LER are set on the right side of the lane center line LNC so that the lane center line LNC does not exist between the left end line LEL and the right end line LER, the vehicle driving support device 10 sets the line closest to the lane center line LNC, of the left end line LEL and the right end line LER, as the target traveling line Ltgt. In the scene shown in FIG. 6B, since the left end line LEL and the right end line LER are set on the right side of the lane center line LNC, the vehicle driving support device 10 sets the left end line LEL closer to the lane center line LNC as the target traveling line Ltgt.

As described above, when the left end line LEL and the right end line LER are set in the left-to-right order, the vehicle driving support device 10 sets the target traveling line Ltgt in accordance with the positional relationship between the left end line LEL, the right end line LER, and the lane center line LNC.

Figure 7A:
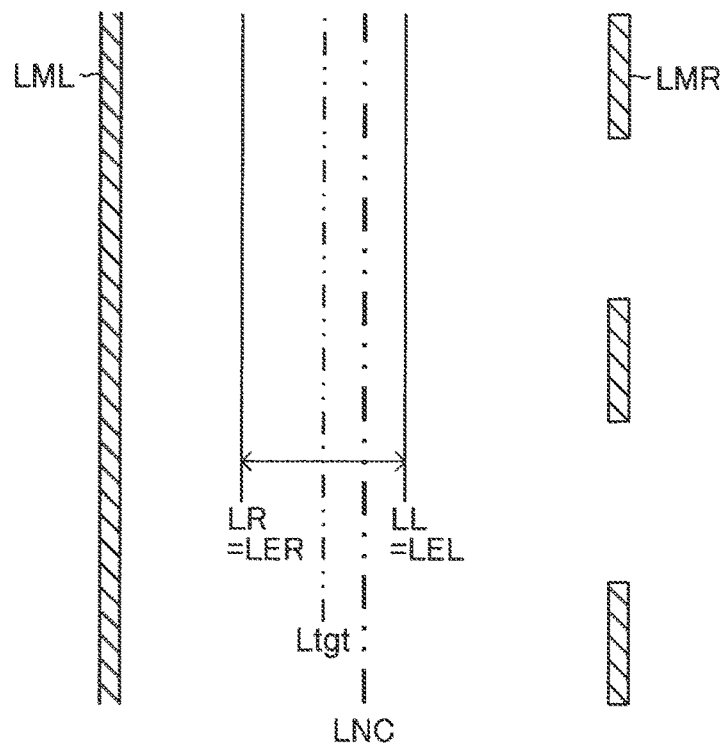
FIG. 7A is a diagram showing a scene in which the left end line and the right end line are set in a right-to-left order and the lane center line exists between the left end line and the right end line.
Figure 7B:
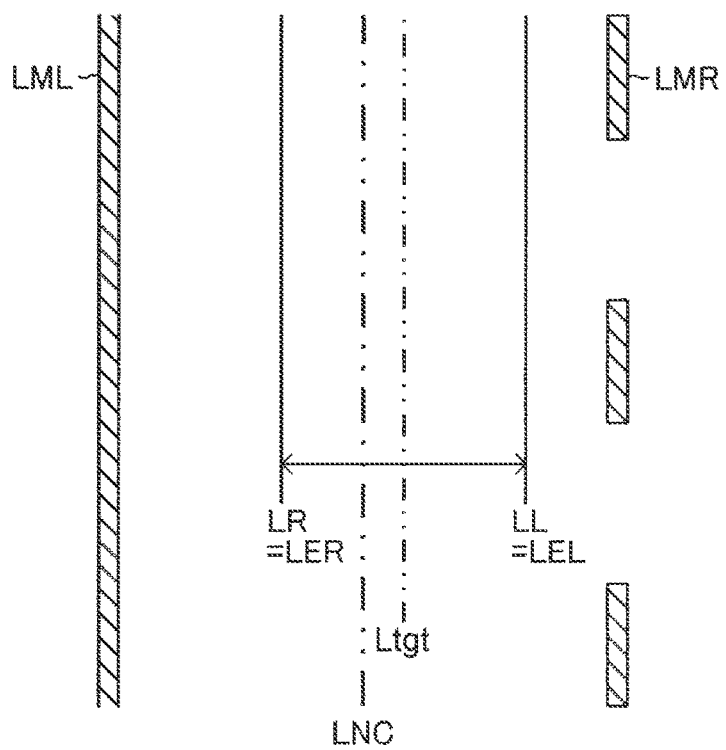
FIG. 7B is another diagram showing a scene in which the left end line and the right end line are set in the right-to-left order and the lane center line exists between the left end line and the right end line.

Further, as shown in FIGS. 7A and 7B, in the case where the left end line LEL and the right end line LER are set in the right-to-left order (that is, the left end line LEL is set on the right side of the right end line LER, and therefore the right end line LER is set on the left side of the left end line LEL), even when the lane center line LNC exists between the left end line LEL and the right end line LER, the vehicle driving support device 10 sets the line between the left end line LEL and the right end line LER as the target traveling line Ltgt regardless of the lane center line LNC. At this time, the line set as the target traveling line Ltgt may be any line as long as it is a line between the left end line LEL and the right end line LER, but in this example, the center line between the left end line LEL and the right end line LER is used.

In the scene shown in FIG. 7A, since the center line between the left end line LEL and the right end line LER is on the left side of the lane center line LNC, the target traveling line Ltgt is set on the left side of the lane center line LNC. Similarly, in the scene shown in FIG. 7B, since the center line between the left end line LEL and the right end line LER is on the right side of the lane center line LNC, the target traveling line Ltgt is set on the right side of the lane center line LNC.

Figure 8A:
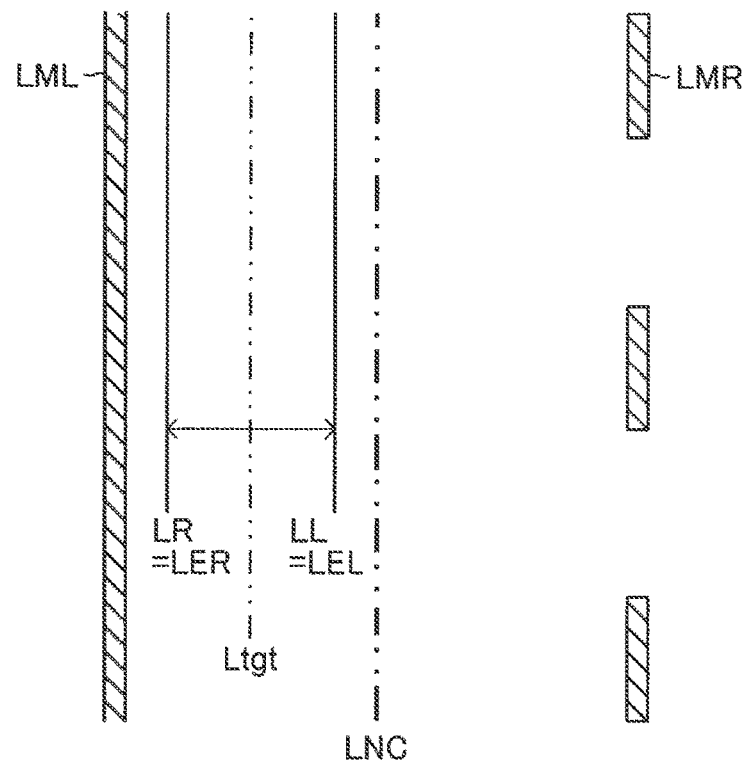
FIG. 8A is a diagram showing a scene in which the left end line and the right end line are set in the right-to-left order and the lane center line does not exist between the left end line and the right end line.
Figure 8B:
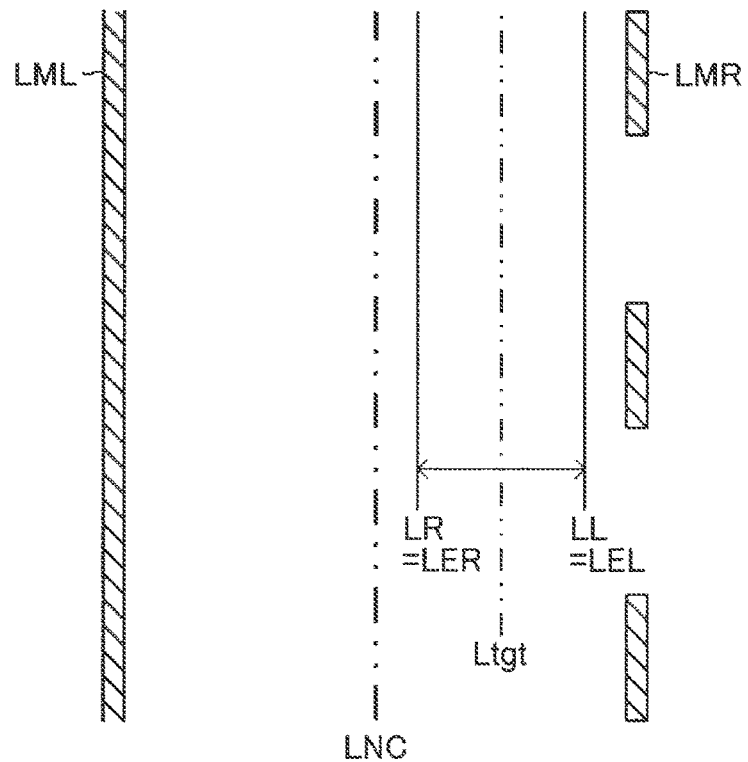
FIG. 8B is another diagram showing a scene in which the left end line and the right end line are set in the right-to-left order and the lane center line does not exist between the left end line and the right end line.

Further, as shown in FIGS. 8A and 8B, in the case where the left end line LEL and the right end line LER are set in the right-to-left order, even when the lane center line LNC does not exist between the left end line LEL and the right end line LER, the vehicle driving support device 10 sets the line between the left end line LEL and the right end line LER as the target traveling line Ltgt regardless of the lane center line LNC. At this time, the line set as the target traveling line Ltgt may be any line as long as it is a line between the left end line LEL and the right end line LER, but in this example, the center line between the left end line LEL and the right end line LER is used.

In the scene shown in FIG. 8A, since the center line between the left end line LEL and the right end line LER is on the left side of the lane center line LNC, the target traveling line Ltgt is set on the left side of the lane center line LNC. Similarly, in the scene shown in FIG. 8B, since the center line between the left end line LEL and the right end line LER is on the right side of the lane center line LNC, the target traveling line Ltgt is set on the right side of the lane center line LNC.

The vehicle driving support device 10 sets the target traveling line Ltgt as described above.

The vehicle driving support device 10 may be configured to set the target traveling line Ltgt as described below when the left end line LEL and the right end line LER are set in the left-to-right order.

Figure 9A:
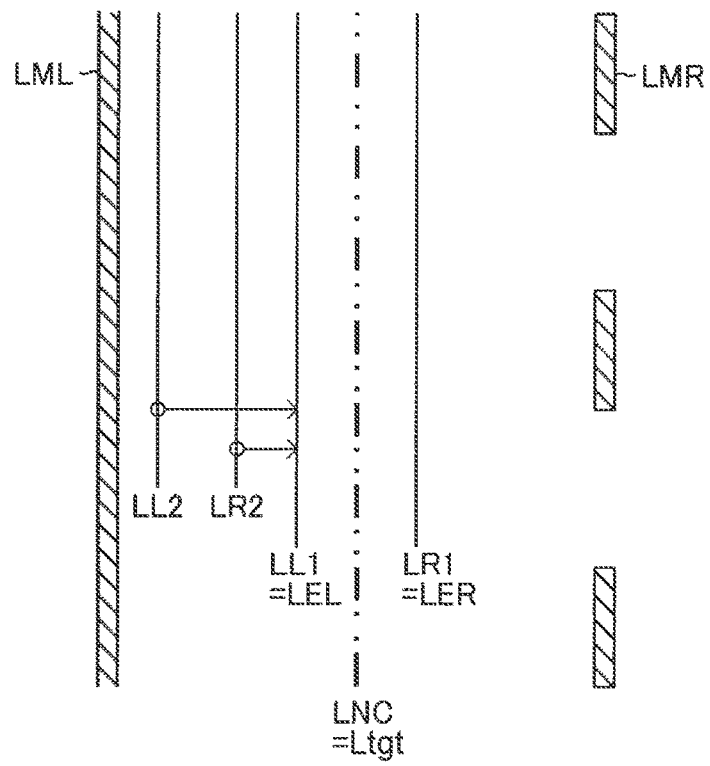
FIG. 9A is a diagram showing a scene in which two left limit lines and two right limit lines are set.

That is, as shown in FIG. 9A, in a scene in which two left limit lines LL (first left limit line LL1 and second left limit line LL2) having different target priorities are set, two right limit lines LR (first right limit line LR1 and second right limit line LR2) having different target priorities are set, and both the second right limit line LR2 and the second left limit line LL2 are set on the left side of the first left limit line LL1, when the target priority of the first left limit line LL1 is higher than the target priority of the second right limit line LR2, the vehicle driving support device 10 may reset the second right limit line LR2 having a lower target priority as a line that coincides with the first left limit line LL1 having a higher priority.

That is, when the left limit line LL and the right limit line LR are set in the right-to-left order and the target priority of the left limit line LL is higher than the target priority of the right limit line LR, the vehicle driving support device 10 may reset the right limit line LR as a line that coincides with the left limit line LL.

Further, in the scene shown in FIG. 9A, when the target priority of the first left limit line LL1 is higher than the target priority of the second left limit line LL2, the vehicle driving support device 10 may reset the second left limit line LL2 having a lower target priority as a line that coincides with the first left limit line LL1 having a higher target priority.

That is, when there are at least two left limit lines LL having different target priorities and the left limit line LL having the lower target priority is set on the left side of the left limit line LL having the higher target priority, the vehicle driving support device 10 may reset the left limit line LL having the lower target priority as a line coinciding with the left limit line LL having the higher target priority.

In the scene shown in FIG. 9A, the vehicle driving support device 10 sets the first left limit line LL1 (the second right limit line LR2 that has been reset or the second left limit line LL2 that has been reset) as the left end line LEL, sets the first right limit line LR1 as the right end line LER, and then sets the target traveling line Ltgt as described above. That is, in the scene shown in FIG. 9A, since the lane center line LNC exists between the left end line LEL and the right end line LER, the vehicle driving support device 10 sets the lane center line LNC as the target traveling line Ltgt.

Therefore, in the scene shown in FIG. 9A, it can be considered that the vehicle driving support device 10 cancels the second right limit line LR2 and the second left limit line LL2 set on the left side of the first left limit line LL1 having the higher target priority, and sets the remaining first left limit line LL1 and the remaining first right limit line LR1 as the left end line LEL and the right end line LER, respectively.

The target priority is a priority as a target to be considered in setting the target traveling line Ltgt, and the priority becomes higher as the requirement to be considered in setting the target traveling line Ltgt becomes higher. For example, the target priorities of the left limit line LL and the right limit line LR each set for the left side lane marking line LML and the right side lane marking line LMR are higher than the target priorities of the left limit line LL and the right limit line LR set for other targets. As described above, the target priority is a parameter related to determining whether to consider the left limit line LL or the right limit line LR in setting the target traveling line Ltgt.

Figure 9B:
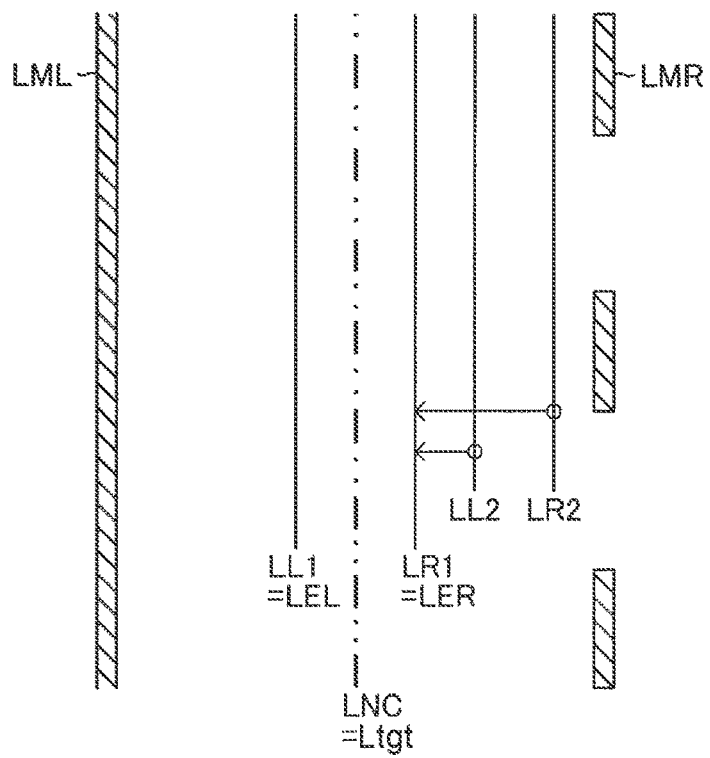
FIG. 9B is another diagram showing a scene in which two left limit lines and two right limit lines are set.

Similarly, as shown in FIG. 9B, in a scene in which two left limit lines LL (first left limit line LL1 and second left limit line LL2) having different target priorities are set, two right limit lines LR (first right limit line LR1 and second right limit line LR2) having different target priorities are set, and both the second right limit line LR2 and the second left limit line LL2 are set on the right side of the first right limit line LR1, when the target priority of the first right limit line LR1 is higher than the target priority of the second left limit line LL2, the vehicle driving support device 10 may reset the second left limit line LL2 having a lower target priority as a line that coincides with the first right limit line LR1 having a higher priority.

That is, when the left limit line LL and the right limit line LR are set in the right-to-left order and the target priority of the right limit line LR is higher than the target priority of the left limit line LL, the vehicle driving support device 10 may reset the left limit line LL as a line that coincides with the right limit line LR.

Further, in the scene shown in FIG. 9B, when the target priority of the first right limit line LR1 is higher than the target priority of the second right limit line LR2, the vehicle driving support device 10 may reset the second right limit line LR2 having the lower target priority as a line that coincides with the first right limit line LR1 having the higher target priority.

That is, when there are at least two left limit lines LL having different target priorities and the right limit line LR having the lower target priority is set on the right side of the right limit line LR having the higher target priority, the vehicle driving support device 10 may reset the right limit line LR having the lower target priority as a line coinciding with the right limit line LR having the higher target priority.

In the scene shown in FIG. 9B, the vehicle driving support device 10 sets the first left limit line LL1 as the left end line LEL, sets the first right limit line LR1 (the second left limit line LL2 that has been reset or the second right limit line LR2 that has been reset) as the right end line LER, and then sets the target traveling line Ltgt as described above. That is, in the scene shown in FIG. 9B, since the lane center line LNC exists between the left end line LEL and the right end line LER, the vehicle driving support device 10 sets the lane center line LNC as the target traveling line Ltgt.

Therefore, in the scene shown in FIG. 9B, it can be considered that the vehicle driving support device 10 cancels the second left limit line LL2 and the second right limit line LR2 set on the right side of the first right limit line LR1 having the higher target priority, and sets the remaining first left limit line LL1 and the remaining first right limit line LR1 as the left end line LEL and the right end line LER, respectively.

Figure 10A:
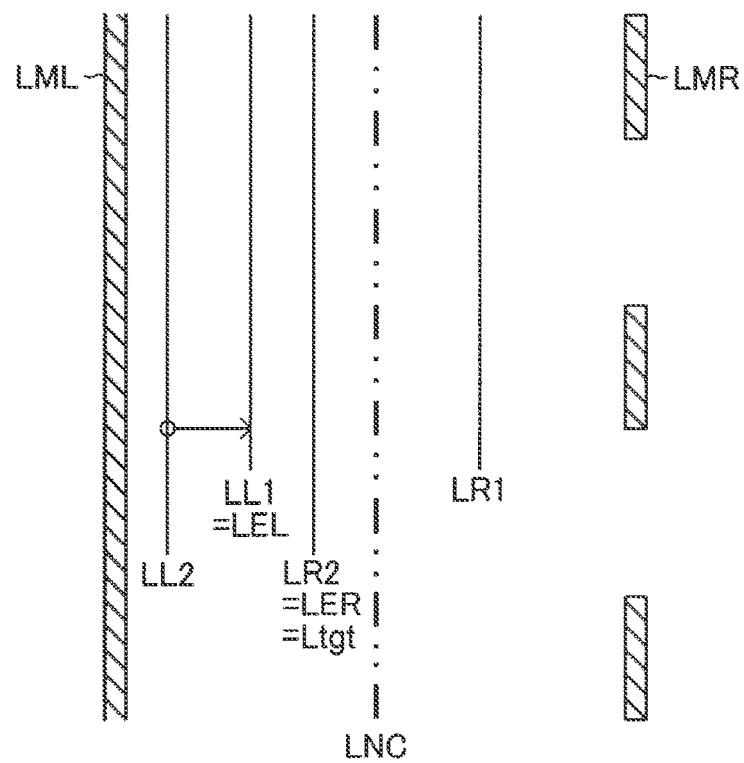
FIG. 10A is a diagram showing a scene in which two left limit lines and two right limit lines are set.

When the vehicle driving support device 10 is configured in this way, for example, as shown in FIG. 10A, in a scene in which two left limit lines LL (first left limit line LL1 and second left limit line LL2) having different target priorities are set, two right limit lines LR (first right limit line LR1 and second right limit line LR2) having different target priorities are set, and the second right limit line LR2 is set on the right side of the first left limit line LL1 but the second left limit line LL2 is set on the left side of the first left limit line LL1, even when the target priority of the first left limit line LL1 is higher than the target priority of the second right limit line LR2, the second right limit line LR2 is set on the right side of the first left limit line LL1 (that is, the second right limit line LR2 and the first left limit line LL1 are set in the left-to-right order), so that the vehicle driving support device 10 does not reset the second right limit line LR2.

Further, in the scene shown in FIG. 10A, when the target priority of the first left limit line LL1 is higher than the target priority of the second left limit line LL2, the vehicle driving support device 10 resets the second left limit line LL2 having the lower target priority as a line that coincides with the first left limit line LL1 having the higher target priority.

In the scene shown in FIG. 10A, the vehicle driving support device 10 sets the first left limit line LL1 (the second left limit line LL2 that has been reset) as the left end line LEL, sets the second right limit line LR2 as the right end line LER since the second right limit line LR2 having the lower target priority is set on the left side of the first right limit line LR1 having the higher target priority, and then sets the target traveling line Ltgt as described above. That is, in the scene shown in FIG. 10A, since the lane center line LNC does not exist between the left end line LEL and the right end line LER, the vehicle driving support device 10 sets the line closer to the lane center line LNC (the right end line LER) as the target traveling line Ltgt.

Figure 10B:
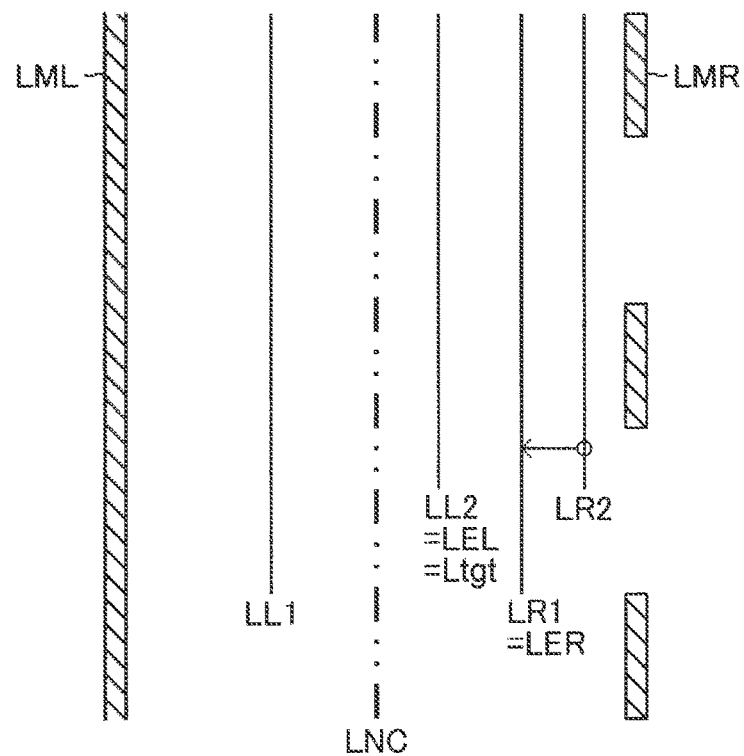
FIG. 10B is another diagram showing a scene in which two left limit lines and two right limit lines are set.

Further, as shown in FIG. 10B, in a scene in which two left limit lines LL (first left limit line LL1 and second left limit line LL2) having different target priorities are set, two right limit lines LR (first right limit line LR1 and second right limit line LR2) having different target priorities are set, and the second left limit line LL2 is set on the left side of the first right limit line LR1 but the second right limit line LR2 is set on the right side of the first right limit line LR1, even when the target priority of the first right limit line LR1 is higher than the target priority of the second left limit line LL2, the second left limit line LL2 is set on the left side of the first right limit line LR1 (that is, the second left limit line LL2 and the first right limit line LR1 are set in the left-to-right order), so that the vehicle driving support device 10 does not reset the second left limit line LL2.

Further, in the scene shown in FIG. 10B, when the target priority of the first right limit line LR1 is higher than the target priority of the second right limit line LR2, the vehicle driving support device 10 resets the second right limit line LR2 having the lower target priority as a line that coincides with the first right limit line LR1 having the higher target priority.

In the scene shown in FIG. 10B, the vehicle driving support device 10 sets the first right limit line LR1 (the second right limit line LR2 that has been reset) as the right end line LER, sets the second left limit line LL2 as the left end line LEL since the second left limit line LL2 having the lower target priority is set on the right side of the first left limit line LL1 having the higher target priority, and then sets the target traveling line Ltgt as described above. That is, in the scene shown in FIG. 10B, since the lane center line LNC does not exist between the left end line LEL and the right end line LER, the vehicle driving support device 10 sets the line closer to the lane center line LNC (the left end line LEL) as the target traveling line Ltgt.

Figure 11A:
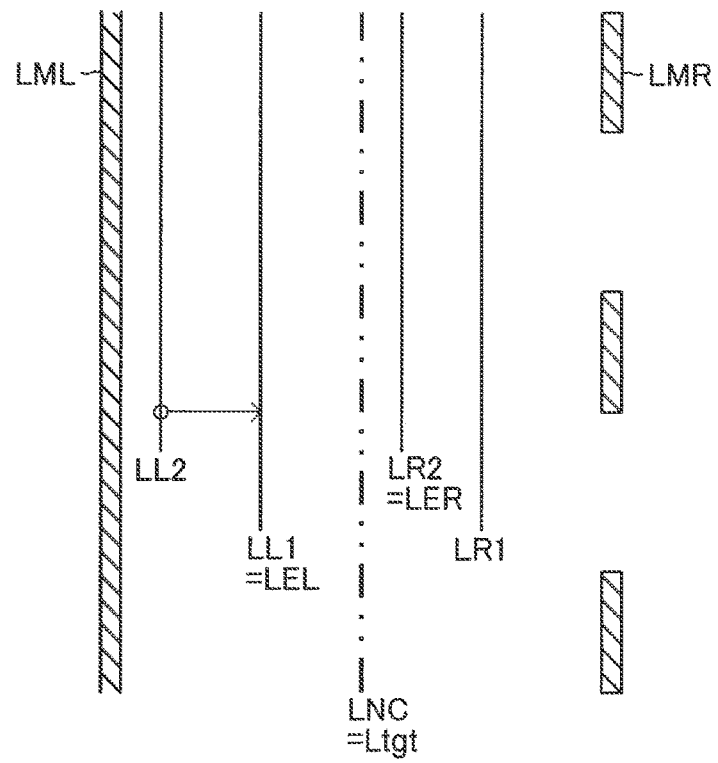
FIG. 11A is a diagram showing a scene in which two left limit lines and two right limit lines are set.

As shown in FIG. 11A, in a scene in which two left limit lines LL (first left limit line LL1 and second left limit line LL2) having different target priorities are set, two right limit lines LR (first right limit line LR1 and second right limit line LR2) having different target priorities are set, and the second right limit line LR2 is set on the right side of the first left limit line LL1 but the second left limit line LL2 is set on the left side of the first left limit line LL1, even when the target priority of the first left limit line LL1 is higher than the target priority of the second right limit line LR2, the second right limit line LR2 is set on the right side of the first left limit line LL1 (that is, the second right limit line LR2 and the first left limit line LL1 are set in the left-to-right order), so that the vehicle driving support device 10 does not reset the second right limit line LR2 as described above.

Further, in the scene shown in FIG. 11A, when the target priority of the first left limit line LL1 is higher than the target priority of the second left limit line LL2, the vehicle driving support device 10 resets the second left limit line LL2 having the lower target priority as a line that coincides with the first left limit line LL1 having the higher target priority as described above.

In the scene shown in FIG. 11A, the vehicle driving support device 10 sets the first left limit line LL1 (the second left limit line LL2 that has been reset) as the left end line LEL, sets the second right limit line LR2 as the right end line LER since the second right limit line LR2 having the lower target priority is set on the left side of the first right limit line LR1 having the higher target priority, and then sets the target traveling line Ltgt as described above. That is, in the scene shown in FIG. 11A, since the lane center line LNC exists between the left end line LEL and the right end line LER, the vehicle driving support device 10 sets the lane center line LNC as the target traveling line Ltgt.

Figure 11B:
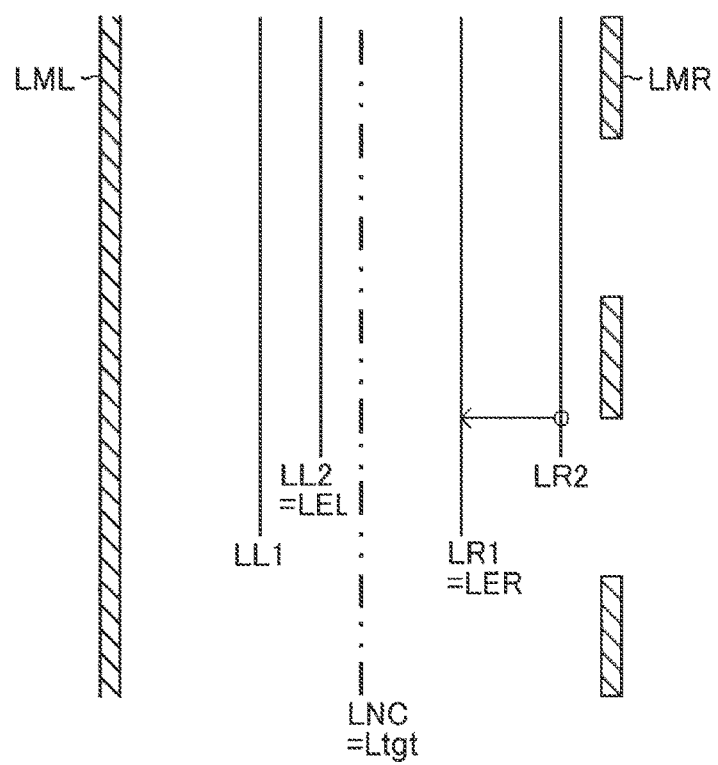
FIG. 11B is another diagram showing a scene in which two left limit lines and two right limit lines are set.

Further, as shown in FIG. 11B, in a scene in which two left limit lines LL (first left limit line LL1 and second left limit line LL2) having different target priorities are set, two right limit lines LR (first right limit line LR1 and second right limit line LR2) having different target priorities are set, and the second left limit line LL2 is set on the left side of the first right limit line LR1 but the second right limit line LR2 is set on the right side of the first right limit line LR1, even when the target priority of the first right limit line LR1 is higher than the target priority of the second left limit line LL2, the second left limit line LL2 is set on the left side of the first right limit line LR1 (that is, the second left limit line LL2 and the first right limit line LR1 are set in the left-to-right order), so that the vehicle driving support device 10 does not reset the second left limit line LL2.

Further, in the scene shown in FIG. 11B, when the target priority of the first right limit line LR1 is higher than the target priority of the second right limit line LR2, the vehicle driving support device 10 resets the second right limit line LR2 having the lower target priority as a line that coincides with the first right limit line LR1 having the higher target priority as described above.

In the scene shown in FIG. 11B, the vehicle driving support device 10 sets the first right limit line LR1 (the second right limit line LR2 that has been reset) as the right end line LER, sets the second left limit line LL2 as the left end line LEL since the second left limit line LL2 having the lower target priority is set on the right side of the first left limit line LL1 having the higher target priority, and then sets the target traveling line Ltgt as described above. That is, in the scene shown in FIG. 11B, since the lane center line LNC exists between the left end line LEL and the right end line LER, the vehicle driving support device 10 sets the lane center line LNC as the target traveling line Ltgt.

Figure 12:
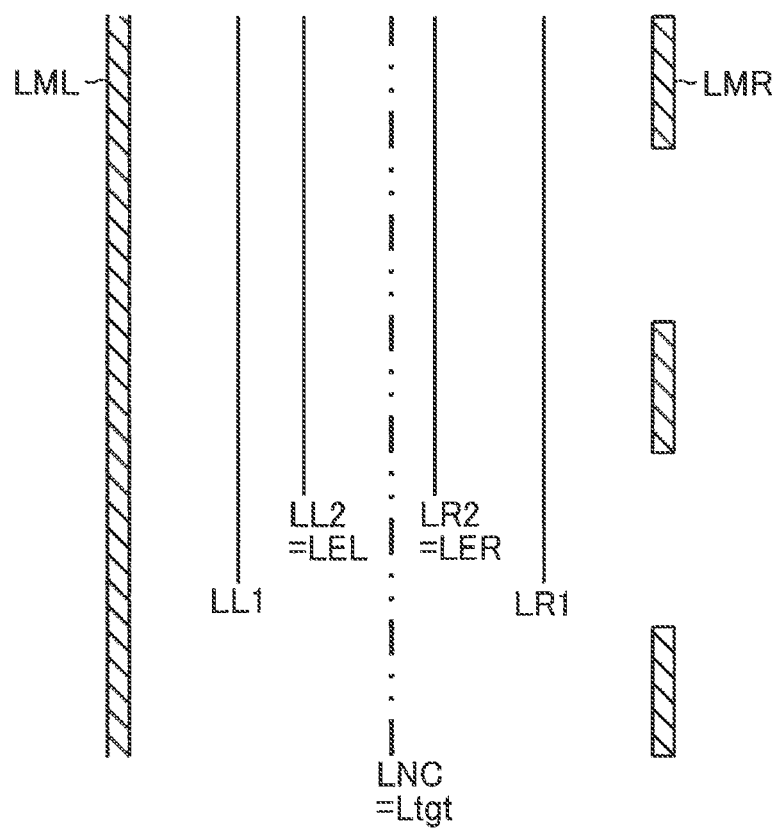
FIG. 12 is a diagram showing a scene in which two left limit lines and two right limit lines are set.

As shown in FIG. 12, in a scene in which two left limit lines LL (first left limit line LL1 and second left limit line LL2) having different target priorities are set, two right limit lines LR (first right limit line LR1 and second right limit line LR2) having different target priorities are set, and both the second left limit line LL2 and the second right limit line LR2 are set between the first left limit line LL1 and the first right limit line LR1, even when the target priority of the first left limit line LL1 is higher than the target priority of the second right limit line LR2, the second right limit line LR2 is set on the right side of the first left limit line LL1 (that is, the second right limit line LR2 and the first left limit line LL1 are set in the left-to-right order), so that the vehicle driving support device 10 does not reset the second right limit line LR2. Further, even when the target priority of the first right limit line LR1 is higher than the target priority of the second left limit line LL2, the second left limit line LL2 is set on the left side of the first right limit line LR1 (that is, the second left limit line LL2 and the first right limit line LR1 are set in the left-to-right order), so that the vehicle driving support device 10 does not reset the second left limit line LL2.

In the scene shown in FIG. 12, since the second left limit line LL2 having the lower target priority is set on the right side of the first left limit line LL1 having the higher target priority, the second left limit line LL2 is set as the left end line LEL, and since the second right limit line LR2 having the lower target priority is set on the left side of the first right limit line LR1 having the higher target priority, the second right limit line LR2 is set as the right end line LER. The target traveling line Ltgt is thus set as described above. That is, in the scene shown in FIG. 12, since the lane center line LNC exists between the left end line LEL and the right end line LER, the vehicle driving support device 10 sets the lane center line LNC as the target traveling line Ltgt.

Figure 13A:
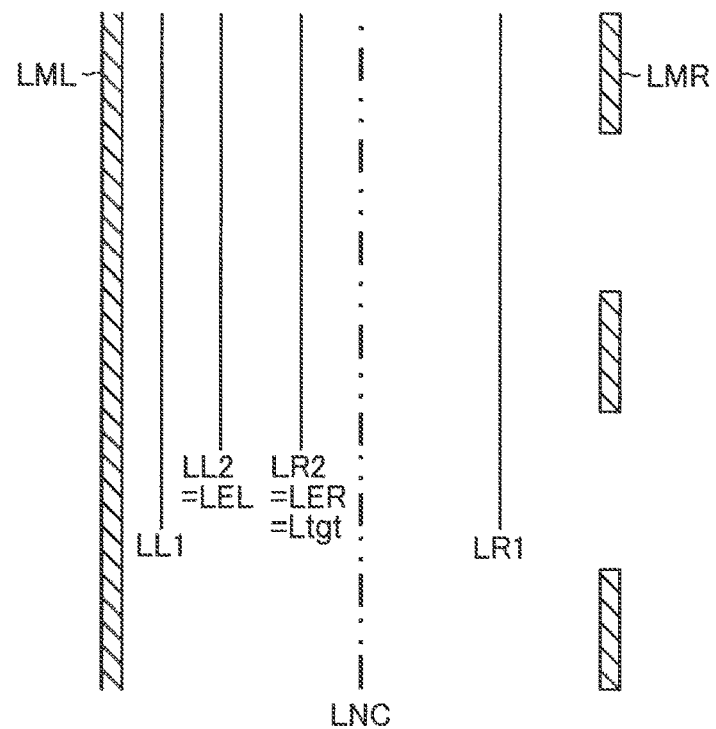
FIG. 13A is a diagram showing a scene in which two left limit lines and two right limit lines are set.
Figure 13B:
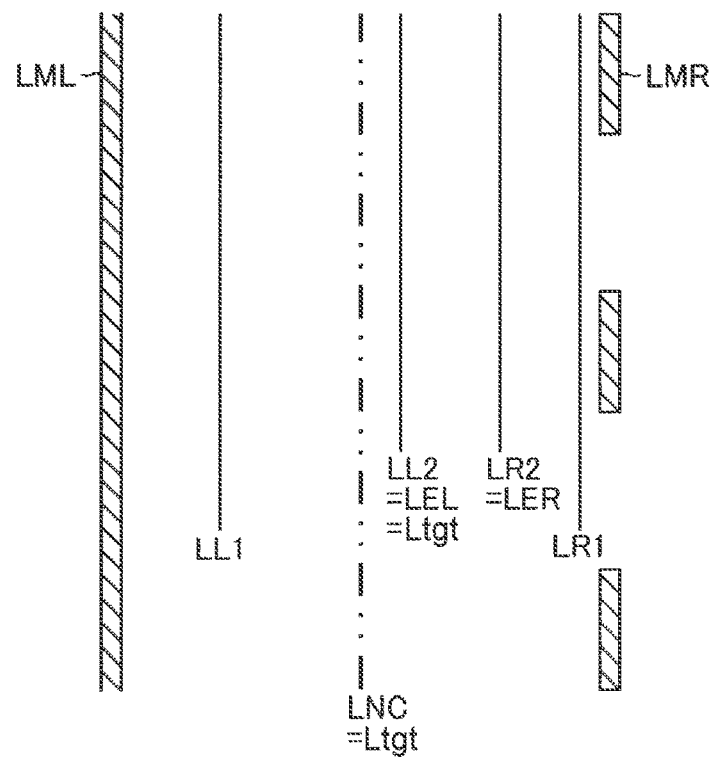
FIG. 13B is another diagram showing a scene in which two left limit lines and two right limit lines are set.

As shown in FIGS. 13A and 13B, in a scene in which two left limit lines LL (first left limit line LL1 and second left limit line LL2) having different target priorities are set, two right limit lines LR (first right limit line LR1 and second right limit line LR2) having different target priorities are set, and both the second left limit line LL2 and the second right limit line LR2 are set between the first left limit line LL1 and the first right limit line LR1, even when the target priority of the first left limit line LL1 is higher than the target priority of the second right limit line LR2, the second right limit line LR2 is set on the right side of the first left limit line LL1 (that is, the second right limit line LR2 and the first left limit line LL1 are set in the left-to-right order), so that the vehicle driving support device 10 does not reset the second right limit line LR2 as described above. Further, even when the target priority of the first right limit line LR1 is higher than the target priority of the second left limit line LL2, the second left limit line LL2 is set on the left side of the first right limit line LR1 (that is, the second left limit line LL2 and the first right limit line LR1 are set in the left-to-right order), so that the vehicle driving support device 10 does not reset the second left limit line LL2 as described above.

In the scene shown in FIGS. 13A and 13B, since the second left limit line LL2 having the lower target priority is set on the right side of the first left limit line LL1 having the higher target priority, the second left limit line LL2 is set as the left end line LEL, and since the second right limit line LR2 having the lower target priority is set on the left side of the first right limit line LR1 having the higher target priority, the second right limit line LR2 is set as the right end line LER, and then the target traveling line Ltgt is set as described above.

That is, in the scene shown in FIG. 13A, the lane center line LNC does not exist between the left end line LEL and the right end line LER, and the left end line LEL and the right end line LER are set on the left side of the lane center line LNC. Therefore, the vehicle driving support device 10 sets the line closer to the lane center line LNC (the right end line LER, that is, the second right limit line LR2 in this example) as the target traveling line Ltgt.

On the other hand, in the scene shown in FIG. 13B, the lane center line LNC does not exist between the left end line LEL and the right end line LER, and the left end line LEL and the right end line LER are set on the right side of the lane center line LNC. Therefore, the vehicle driving support device 10 sets the line closer to the lane center line LNC (the left end line LEL, that is, the second left limit line LL2 in this example) as the target traveling line Ltgt.

In the above, the operation of the vehicle driving support device 10 has been described by taking as an example the case where two left limit lines LL and two right limit lines LR having different target priorities are set. When three or more left limit lines LL having different target priorities and three or more right limit lines LR having different target priorities are set, similar to the above examples, the two left limit lines LL having different target priorities, the two right limit lines LR having different target priorities, and one left limit line LL and one right limit line LR having different target priorities can be sequentially compared with each other in order to determine the left end line LEL, the right end line LER, and then the target traveling line Ltgt.

When a plurality of left limit lines LL remain as a result of resetting the left limit line LL and the right limit line LR as described with reference to FIGS. 9A to 11B, the vehicle driving support device 10 sets the left limit line LL located on the rightmost side, of those left limit lines LL, as the left end line LEL as described with reference to FIG. 4, and when a plurality of right limit lines LR remain, the vehicle driving support device 10 sets the right limit line LR located on the leftmost side, of those right limit lines LR, as the right end line LER as described with reference to FIG. 4.

Effects

According to the vehicle driving support device 10, when the left end line LEL and the right end line LER are set in the left-to-right order and the lane center line LNC is within the range (target settable range) defined by the left end line LEL and the right end line LER, the lane center line LNC is set as the target traveling line Ltgt, so that an appropriate target traveling line Ltgt can be set. On the other hand, even when the lane center line LNC does not exist within the target settable range, the line closer to the lane center line LNC, of the left end line LEL and the right end line LER that define the target settable range, is set as the target traveling line Ltgt, so that an appropriate target traveling line Ltgt can be set.

Further, when the left end line LEL and the right end line LER are set in the right-to-left order, the line between the left end line LEL and the right end line LER (particularly, the center line) is set as the target traveling line Ltgt. Therefore, an appropriate target traveling line Ltgt can be set.

Specific Operation of Vehicle Driving Support Device

Figure 14:
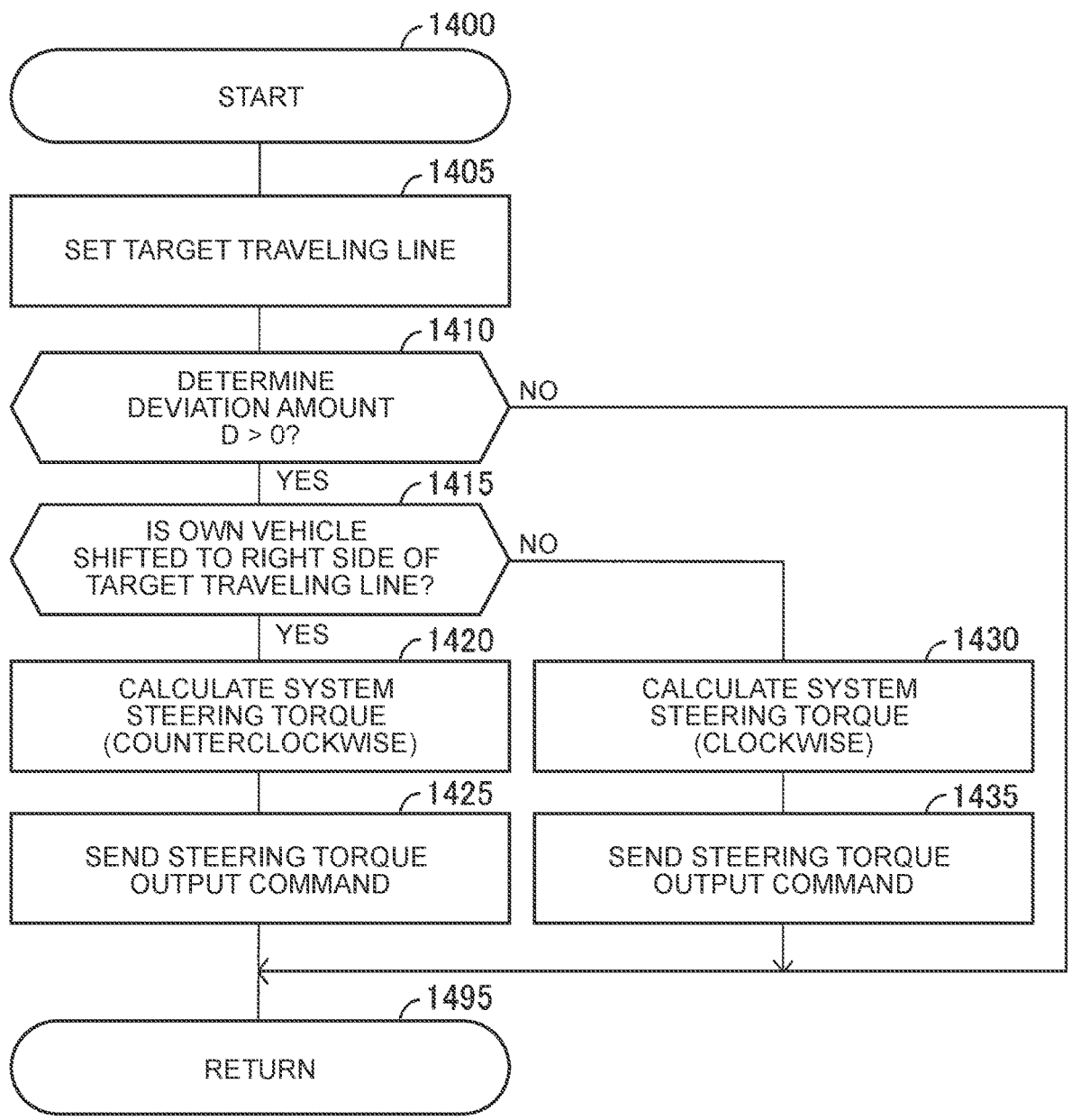
FIG. 14 is a flowchart showing a routine executed by the vehicle driving support device according to the embodiment of the present disclosure.

Next, the specific operation of the vehicle driving support device 10 will be described. The CPU of the ECU 90 of the vehicle driving support device 10 executes the routine shown in FIG. 14 at a predetermined calculation cycle. Therefore, at a predetermined timing, the CPU starts the process from step 1400 of the routine shown in FIG. 14, proceeds to step 1405, and sets the target traveling line Ltgt as described above. Subsequently, the CPU advances the process to step 1410, and determines whether the deviation amount D of the target traveling line Ltgt set in step 1405 is larger than zero.

When the CPU determines "Yes" in step 1410, the process proceeds to step 1415 and the CPU determines whether the own vehicle reference point Pref is shifted to the right side of the target traveling line Ltgt.

When the CPU determines "Yes" in step 1415, the process proceeds to step 1420 and the CPU calculates the system steering torque TQ_S required to turn the own vehicle 100 in the left direction and to return the own vehicle reference point Pref to the target traveling line Ltgt. The CPU then advances the process to step 1425 and sends a steering torque output command to the steering device 23 to cause the steering device 23 to output the system steering torque TQ_S calculated in step 1420. Subsequently, the CPU advances the process to step 1495 to temporarily end the processes of this routine.

On the other hand, when the CPU determines "No" in step 1415, the process proceeds to step 1430 and the CPU calculates the system steering torque TQ_S required to turn the own vehicle 100 in the right direction and to return the own vehicle reference point Pref to the target traveling line Ltgt. The CPU then advances the process to step 1435 and sends a steering torque output command to the steering device 23 to cause the steering device 23 to output the system steering torque TQ_S calculated in step 1430. Subsequently, the CPU advances the process to step 1495 to temporarily end the processes of this routine.

When the CPU determines "No" in step 1410, the CPU directly advances the process to step 1495 to temporarily end the processes of this routine.

The above is the specific operation of the vehicle driving support device 10.

The present disclosure is not limited to the above embodiment, and various modifications can be adopted within the scope of the present disclosure.

What is claimed is:

1. A vehicle driving support device including a control device configured to set a target traveling line and execute lane keeping control, the lane keeping control performing autonomous steering of an own vehicle to travel along the target traveling line, the control device comprising a processor configured to set a left limit line as a left end line and a right limit line as a right end line during execution of the lane keeping control, the left limit line being a line extending along a current lane and passing through a position offset rightward from a left-side target by a predetermined left side separation distance, the left-side target being a target present on a left side of the own vehicle, the right limit line being a line extending along the current lane and passing through a position offset leftward from a right-side target by a predetermined right side separation distance, the right-side target being a target present on a right side of the own vehicle, set a center line of the current lane as the target traveling line when the center line is located between the left end line and the right end line, and set a line closer to the center line, of the left end line and the right end line, as the target traveling line when the center line is not located between the left end line and the right end line, in a case where the left end line is set on a left side of the right end line, in a traveling direction, and set a line between the left end line and the right end line as the target traveling line in a case where the left end line is set on a right side of the right end line, in the traveling direction.

2. The vehicle driving support device according to claim 1, wherein the processor is configured to set a center line between the left end line and the right end line as the target traveling line when the left end line is set on the right side of the right end line, in the traveling direction.

3. The vehicle driving support device according to claim 1, wherein the processor is configured to set a target priority on the left limit line and the right limit line when there are a plurality of left limit lines or right limit lines, cancel a first right limit line when a target priority of a first left limit line is higher than a target priority of the first right limit line, and cancel the first left limit line when the target priority of the first right limit line is higher than the target priority of the first left limit line, the first left limit line and the first right limit line being a pair of a left limit line and a right limit line of the plurality of left limit lines or right limit lines, and the first left limit line being set on a right side of the first right limit line, and set the left end line and the right end line from a remaining left limit line and a remaining right limit line.

4. The vehicle driving support device according to claim 1, wherein the processor is further configured to set a target priority on the left limit line and the right limit line when there are at least two left limit lines or right limit lines, cancel a left limit line having a lower target priority when there are at least two left limit lines having different target priorities and the left limit line having the lower target priority is set on a left side of a left limit line having the higher target priority, and cancel a right limit line having a lower target priority when there are at least two right limit lines having different target priorities and the right limit line having the lower target priority is set on a right side of a right limit line having the higher target priority, and set the left end line and the right end line from a remaining left limit line and a remaining right limit line.

5. The vehicle driving support device according to claim 3, wherein the target priority is a priority as a target to be considered in setting the target traveling line, and the target priority becomes higher as a requirement to be considered in setting the target traveling line becomes higher.

6. The vehicle driving support device according to claim 3, wherein the processor is configured to maintain the first left limit line and the first right limit line even when the first left limit line and the first right limit line have different target priorities, in the case where the first left limit line is set on a left side of the first right limit line.

7. The vehicle driving support device according to claim 3, wherein the processor is configured to
- set a rightmost left limit line, of the remaining left limit line, as the left end line when there are two or more remaining left limit lines, and
- set a leftmost right limit line, of the remaining right limit line, as the right end line when there are two or more remaining right limit lines.

8. The vehicle driving support device according to claim 1, wherein the predetermined left side separation distance and the predetermined right side separation distance are preset for each type of the left-side target and the right-side target, respectively, and are set longer distance as a driver wishes to cause the own vehicle to travel at a longer distance from the left-side target and the right-side target.

* * * * *